US005837351A

United States Patent [19]

Chernovitz et al.

[11] Patent Number: 5,837,351

[45] Date of Patent: Nov. 17, 1998

[54] IMAGE-RECEPTIVE SHEET

[75] Inventors: John J. Chernovitz, East Haven, Conn.; David Habib, East Greenwich, R.I.

[73] Assignee: OCE USA, Inc., Chicago, Ill.

[21] Appl. No.: 759,674

[22] Filed: Dec. 6, 1996

Related U.S. Application Data

[60] Provisional application No. 60/008,394 Dec. 8, 1995, and 60/029,915 Nov. 1, 1996.

[51] Int. Cl.[6] .......... B23B 3/00

[52] U.S. Cl. .......... 428/195; 428/199; 428/206; 428/207; 428/217; 428/218; 428/219; 428/413; 428/511; 428/537.5; 162/134

[58] Field of Search .......... 428/195, 199, 428/206, 207, 217, 218, 219, 537.5, 511, 413; 162/134

[56] References Cited

U.S. PATENT DOCUMENTS

| | | | |
|---|---|---|---|
| 4,100,329 | 7/1978 | Neithardt, Jr. | 428/413 |
| 5,006,389 | 4/1991 | D'Annunzio | 428/76 |
| 5,102,730 | 4/1992 | Muller et al. | 428/323 |

FOREIGN PATENT DOCUMENTS

| | | |
|---|---|---|
| 0 608575A1 | 8/1994 | European Pat. Off. . |
| 1 963398 | 6/1971 | Germany . |
| 41 25590C1 | 10/1992 | Germany . |
| WO 9402325 | 2/1994 | WIPO . |

*Primary Examiner*—Leszek Kiliman
*Attorney, Agent, or Firm*—Birch, Stewart, Kolasch & Birch, LLP

[57] ABSTRACT

A multi-purpose imageable sheet is provided that is useful for multiple applications including manual drafting, ink jet recording and electrophotographic printing and copying. The sheet comprises a base support and a surface coating on at least one side thereof, with the surface coating being formed from an aqueous-based coating formulation that comprises an aqueous dispersion of (i) a crosslinkable polymer and a crosslinking agent therefor, and (ii) a pigment. The surface coating is a pencil, ink and toner receptive crosslinked surface layer that embodies properties that make its surface suitable as a receptor for a variety of imaging means.

10 Claims, No Drawings

IMAGE-RECEPTIVE SHEET

FIELD OF THE INVENTION

This application claims the benefit of U.S. provisional application No. 60/008,394 Dec. 8, 1995, and provisional application No. 60/029,915 Nov. 1, 1996.

This invention relates to a multi-purpose imageable sheet useful for manual drafting, electronic plotting and electrophotographic printing and copying applications, the sheet comprising a base support and a surface coating containing a crosslinked polymer and a pigment, and which produces an image-receptive matrix having physical and electrical properties that provide image-receiving and correcting properties.

BACKGROUND OF THE INVENTION

Vellum, film and opaque paper have long been available as image-receiving media in manual drafting. In more recent years, these products have also been used broadly in impact and non-impact imaging applications such as electrophotographic copying and printing, electronic plotting that utilizes pen, pencil or ball point marking devices, and other imaging methods. Over time, a large number of different specialized products has evolved to meet the diverse requirements of the various imaging systems. Thus, the manufacture, inventory, distribution and use of the variety of these specialized products has become cumbersome and costly. The development of a multi-purpose image-receptive matrix suitable for a variety of substrates and applications would therefore offer significant commercial advantage over the many presently available specialized products.

The art of image-receiving media has historically been replete with formulations designed to optimize each product type for a particular use. Generally, each formulation utilizes specific polymers or polymer types, pigments and additives to produce a product having limited specialized use. This approach requires the manufacturer to make, carry and distribute many separate products. Moreover, some of the products require multiple coating operations which adds further to their cost. By contrast, the multi-purpose imageable products of the instant invention are each less complex to make and may be used in several applications, thereby reducing the number of products and their associated cost. Moreover, these multi-purpose products function well on a broad spectrum of imaging equipment.

The advantages of the inventive multi-purpose imageable sheet derive from the combined use of several concepts, which include the following: (1) aqueous rather than solvent-based formulations are employed that have cost savings and organic solvent containment associated therewith, (2) image-receiving coating formulations that are essentially the same for vellum, film and opaque paper can be used, thus reducing mix-making and product change-over costs during manufacture, and (3) a single product type (e.g., vellum, film or opaque paper) can be used for manual drafting, pen plotting and electrophotographic copying and printing applications. Importantly, this design feature not only substantially reduces the required number of products and their inventories, but also affords greater convenience for both the product manufacturer and end user. Collectively, these advantages furnish significantly lower costs to the manufacturer and more competitive products in the marketplace.

SUMMARY OF THE INVENTION

It is an object of this invention to provide a multi-purpose imageable sheet useful for manual drafting, electronic plotting and electrophotographic printing and copying utilizing an erasable and correctable matrix on a variety of substrates. To design products having properties suitable for these multiple applications requires incorporating into the product design a number of particular physical and electrical properties. In manual drafting, for example, it is important to have good pencil take, ink receptivity and correctability, with this last quality being achieved by having good multiple erasure and redraw qualities. Electronic pen plotting requires similar performance qualities but with much more stringent marking demands because of the much faster computer generated recording speeds. Electrophotographic imaging additionally requires good toner adhesion and image resolution over a wide range of ambient relative humidities.

In accordance with these objectives, the present invention employs vellum, film or opaque paper as the base support and a novel discrete layer or matrix as a surface coating. The inventive surface coating comprises a pencil, ink and toner receptive crosslinked polymeric matrix that optionally is resistant to migration of transparentizing liquid, and embodies properties that make its surface suitable as a receptor for a variety of imaging means.

The surface coating is preferably made by employing as the binder an aqueous dispersion of a crosslinkable polymer or copolymer. Preferably, the crosslinkable polymer or copolymer is a crosslinkable copolymer of diglycidyl ethers of bisphenol, or a crosslinkable urethane modified bisphenol epoxy resin (e.g., bisphenol A or F epoxy resin), or a crosslinkable modified acrylic resin.

The surface coating or matrix also includes a pigment to provide tooth or abrasivity. A combination of pigments is preferred, particularly crystalline and amorphous silica.

DETAILED DESCRIPTION OF INVENTION

General Requirements

It is an object of this invention to provide multiple application products on vellum, film and opaque paper that are suitable for receiving an image by means of both manual and electronic imaging systems. The surface coating or matrix on the several base supports or substrates is essentially the same and provides suitable receptivity to pencil, ink and toner marking, as well as erasure and redrawing capability. However, each type of base support has its own preparation requirements before the application of the multi-purpose matrix.

The crosslinkable polymers and copolymers employed to prepare the surface coatings are aqueous based binders. They have the advantages of lower cost, improved ease of surface layer correctability, increased surface layer receptivity to ink lines and toners, and absence of retained organic solvents in the final product. This last property is important, since retained solvents can damage photoconductive belts and release objectionable solvent odors during processing in certain imaging devices wherein images are fixed by heating.

Vellums

For the popular vellum type paper products, non-contamination of the photo-receptor surfaces during the imaging process is an additional important requirement for some electrophotographic equipment, as for example the OCE' 7500, 9400, 9700 and 9800 machines, and the XEROX 2500 machine. When utilizing such equipment, transparentizing polymers present on the surface of the vellum transfer to the photo-receptor surface of the equipment thereby causing flawed imaging. Such contamination of the photo-receptive surface is more likely to occur with liquid transparentizers. Thus, another objective of this invention is to provide a surface layer on the paper which not only has the required imaging and correctability qualities but also prevents diffusion of the liquid transparentizer to an exposed surface of the surface coating of the vellum product. The most used vellums are made of 100% rag although papers having a rag content of from 0 to 100% rag may be employed in the present invention.

Transparentization

Most vellums are sold for reprographic applications and are transparentized. Typically, solvent borne solid and liquid transparentizers are generally imbibed into a paper by dissolving the transparentizer in an organic solvent, coating the solution onto the surface of the paper, winding the coated paper into a roll and allowing the solvent laden roll to stand for a number of days, usually from one to three days, so that the transparentizer can diffuse through the interstices of the paper. The roll is then processed through a drying oven to remove the carrier solvent.

Typical solid transparentizers that may be used in the present invention to transparentize the base support include alpha-methyl polystyrene, polypropylene, and the like, dissolved in a solvent mixture, such as a mixture of a polar and non-polar solvent (e.g., acetone and heptane).

The use of a solvent-free transparentizing agent provides cost-savings in the manufacture of the inventive transparentized image receptive papers, by the elimination of a drying step. Moreover, utilization of solventless coating precludes retained obnoxious odors during product use and damage to some electrophotographic photosensitive belts during the imaging process. Mineral oil, a petroleum distillate and commonly used liquid transparentizing polymer suitable for use without solvents, is a preferred transparentizer. However, other acceptable liquid transparentizers include polybutene and glycol esters of hydrogenated resins of suitable viscosity and refractive index.

The solvent-free transparentizing agent is most preferably an essentially colorless high boiling liquid polymer, having a refractive index within 0.06 refractive index units of the base paper and is more preferably within the refractive index range of 1.460 to 1.488 at 25° C.

Numerous application and doctoring techniques are generally employed in the transparentizing of vellums. Applicator techniques include the use of fountain and roll applicators, while doctoring techniques are accomplished by direct or reverse roll coating, scraper bar or Meyer rod, among others. These techniques apply to both liquid and solid solvent-borne transparentization.

Unlike conventional transparentizing, the vellums of this invention preferably do not employ an organic solvent carrier. The preferred mode of transparentizer application is gravure roll, which can apply the precise amount of the liquid transparentizer without requiring any doctoring of the transparentizer or subsequent drying of the vellum. After application, the paper is wound into a roll and is allowed to stand, so that the transparentizer can diffuse throughout the paper. Once the transparentizing process is complete, an image-receptive, correctable surface coating having diffusion resistance to the transparentizing liquid polymer is then applied to one or two surfaces (i.e., sides) of the paper. The discrete surface layer restricts the transparentizing liquid to solely within the interstices of the paper, while providing an image-receptive surface that has appropriate imaging and correctability (i.e. erasure and redraw) qualities when imaged by manual drafting, pen plotting and electrophotographic means, among others.

Accordingly, the inventive transparentized vellum comprises a discrete surface layer on a transparentized paper base, wherein the surface layer is a pigmented and crosslinked polymeric matrix layer having resistance to the diffusion of the paper's transparentizing liquid therethrough. In some applications, the stated liquid diffusion resistance is essential to avoid transferring the transparentizing liquid to the image processing equipment. This prevents possible contamination of electrophotographic photo-receptor belts or other equipment parts in a copying or printing machine that would be adversely affected by the transparentizing liquid.

Films and Opaque Paper

Unlike the vellums, film substrates are non-absorptive and therefore do not require the special preparations that are necessary for vellums. The smooth, non-absorbing surface of films offer an ideal substrate for applying the inventive matrix. Selection of the film substrate depends on user preference and varies in caliper, light transmission and surface finish. Principal product applications for films are similar to those of the vellums and include manual drafting, ink drawing, pen plotting and electrophotographic copying and printing. Less frequent applications of films include offset printing and thermal transfer. Suitable films for these applications include polyesters, cellulose acetate, polystyrene and polyolefins, among others, in clear, translucent and opaque form. The most preferred film substrate is polyethylene terephthalate which is available from most suppliers suitably pretreated so that it bonds well to aqueous coatings.

The preparation of opaque paper substrates requires that the applied inventive matrix form a discrete surface coating. Suitable papers have an internal and surface sizing that prevents uneven and excessive penetration by the coating formulation. Non-transparentized vellum type papers are preferred because of their durability and strength over conventional bond papers and are available in 100% to 0% rag content. Because of its dirt resistance and durability, the inventive opaque paper product is ideal for shop use, being preferable to conventional type bond papers, and is much less expensive and convenient than film.

Binders for Matrix

The binder utilized in the matrix on the various substrates is comprised primarily of a crosslinked polymer, and is used in combination with a pigment, and with additives as required. The uniqueness of the matrix resides in the physical, electrical and chemical balance of properties that it imparts to the image-receptive sheet. The matrix binders employed are preferably aqueous dispersed polymers or copolymers that coalesce and crosslink to produce a hard, discrete surface layer which is ink wettable and controlled as to its surface resistivity. Typical binders that are crosslinkable and available as aqueous-based dispersions, or that can be prepared into the same, include: copolymers of diglycidyl ethers of bisphenol; urethane modified bisphenol epoxy resins (e.g., bisphenol A or F epoxy resins); and modified acrylic resins (e.g., a copolymer of methacrylic acid and methyl methacrylate crosslinked with a polyfunctional aziridine (e.g, CX-100 available from Zeneca)). Exemplary binders include the following, but the invention is not limited thereto:

| | | |
|---|---|---|
| Glascol RP-4 | Allied Colloids | carboxylated acrylic resin (copolymer of polyacrylic acid and polymethyl alkyl acrylate) |
| NeoRez R-972 | Zeneca | colloidal dispersion of aliphatic |

-continued

| | | |
|---|---|---|
| | | carboxylated polyurethane |
| Chempol 20-4301 | CCP Polymers | acrylic emulsion |
| Epi Rez 5520-W-60 | Shell | Modified Bisphenol A epoxy resin |
| Epi Rez W 35201 | Shell | Bisphenol A based epoxy resin |

Similarly, suitable crosslinking agents that may be used in combination with the binders (i.e., crosslinkable polymers) described herein, include the following, but are not limited thereto:

| | | |
|---|---|---|
| CX-100 | Zeneca | polyfunctional aziridine: 1-aziridinepropanoic acid, 2-methyl-2-ethyl-2-[[3-(2 methyl-1-aziridinyl)-1-oxopropoxyl] methyl]-1,3 propandiyl ester |
| Chempol 20-1642 | CCP Polymers | aliphatic epoxy emulsion |
| Epi Cure 3295 | Shell | triethylene tetramine, carboxylic acid glycidyl ester adduct |

Pigments

A suitable pigment is required in the surface coating layer to provide the tooth, i.e., abrasivity and roughness needed to obtain pencil drafting properties, deluster the surface finish and assist in transport through the imaging device. Suitable pigments are selected from the group consisting of crystalline and amorphous silica, aluminum silicate, and calcium carbonate, among others. These pigments may be used either singly or in combination. Pigment hardness is normally in the range of about 4 to about 7 mohs. Suitable particle sizes for the pigment are generally from about 1 to about 15 $\mu$m. A preferred combination of pigments is crystalline and amorphous silica, and a preferred crosslinkable binder to pigment ratio in the surface coating is in the range of about 100:2 to about 100:12, and is more preferably in the range of about 100:4 to about 100:8, on a weight/weight basis. Drafting properties are determined by standard procedures described in Federal Specification UU P-561.

Additives

Additives such as spreading agents, defoamers and. surfactants, among others, may also be employed in the surface layer coating formulations to adjust coating and recording properties. Foam, a prevalent problem during coating, can be controlled with additives such as alkyl alcohols or surfactants such as 2,4,7,9-tetramethyl-5-decyn-4,7-diol. Concentrations used range from 0.5 to 10 percent of total solution weight. Surface tension can be lowered to improve base wetting with a wide variety of agents including nonionic surfactants such as alkylphenyl polyether alcohols, fluoroaliphatic polymeric esters and alkyl glycols, and anionic surfactants such as sodium and ammonium sulfate polymeric salts.

Diffusion Resistance

For the vellums the crosslinked surface coating must have essentially complete resistance to diffusion of the liquid transparentizer to the surface of the paper. Diffusion resistance of the surface coatings of vellums to the liquid transparentizer is determined by the amount of the transparentizing liquid (e.g., mineral oil) that exudes to the surface of the surface coating. The amount of liquid transparentizer on the surface of the surface coating shall be no more than about 0.05 grams per 100 square inches, and preferably no more than about 0.001 grams, when the following test procedure is employed.

The test sample is cut into five 4×4 inch squares. Then 5×5 inch squares of filter paper sheets (Eaton-Dikerson Co., Lab Filter Paper grade 617, 25 cm wide) and 3 mil polyester sheets (ICI grade 505) are also prepared.

Each test sample is sandwiched in the center of two squares of filter paper and the sandwiches are stacked with a square of polyester between each sandwich. The stack is placed between two 5×5 inch plates of glass and this in turn is placed in an oven under 2500 g of mass and heated for 16 hours at 100° C. The samples are then removed from the oven and allowed to cool.

The test for diffusion of the transparentizing liquid from the transparentized paper through the surface coating and into the filter paper is then determined as follows. The filter paper squares that are in contact with the test coatings are cut into small pieces and extracted with 75 ml of tetrahydrofuran (THF) for 30 minutes. The extract is poured into a volumetric flask and THF is added to make 100 ml.

The sample is scanned in a UV spectrophotometer with THF in the reference beam and the amount of transparentizing liquid (e.g., mineral oil) measured against a standard (e.g., 0.25 g mineral oil dissolved in 100 ml THF). The amount of transparentizing liquid extracted is expressed in grams per 100 square inches.

Applications

Suitably prepared vellum, film and opaque sheets of this invention are each used to receive an image by manual, plotter and electrophotographic imaging means. Thus, each base type has a multi-purpose use. In manual drafting and electronic pen plotter applications by pen, the surface of the sheet accepts widely-used Higgins Black Magic Ink, or its equivalent, to provide well-defined and easily readable images. Wettability of the surface of the sheet by the ink is a requisite for good imaging and is measurable by the contact angle of the ink and the surface of the sheet. The contact angle for these applications is preferably between 30° and 80° and at least between 20° and 120°. Ink lines on the matrix surface are cleanly removable by use of a Stadtler Mars Plastic Eraser 526 50, or its equivalent, dipped in water, and once erased and allowed to dry, the matrix surface re-accepts ink lines that are uniformly sharp and continuous. The imageable sheet meets U.S. Federal Government Specification UU-P-561 for inking, erasure and re-inking. It is noted that the test devices and marking materials specified in the test procedures set forth herein are not to be construed as limiting to the present discovery, since those skilled in the art of the present invention will appreciate that equivalents thereto could be used in the test procedures described herein, without departing from the spirit or scope of the present invention.

In manual drafting and electronic plotting applications by pencil, surface abrasivity is such that the lines from lead and polymer pencils such as Pentel P1 and Pentel HB are uniformly dense, and line erasability is clean and easy. These lines are removable without smudging or ghosting when erased with Stadtler Mars-Plastic 526 50 eraser, or its equivalent. The imageable sheet meets U.S. Federal Government Specification UU-P-561 for pencil drafting, erasure and re-drafting.

In electrophotographic applications, the sheet provides toner images that are dense and sharp without excessive background. Surface resistivity is preferably between $1\times10^9$ to $1\times10^{12}$ ohms per square and at least between $1\times10^8$ and $1\times10^{15}$ ohms per square. Imaged lines are dense, sharp and continuous with good toner adhesion to the surface so that the image does not flake off or wear off during normal use. Also, the image is cleanly erasable by an electric eraser of moderate to high abrasivity, and once erased, the imaged sheet is able to accept redraw by pencil or ink.

Toner adhesion tests are conducted on an Océ 9800 copier having a fuser temperature of 135° C., or its equivalent. A test original having a completely opaque 2 inch×4 inch black colored rectangle is copied through the copier to provide a test sheet. The test sheet is folded in half along the center line of the 2×4 inch fill area. The fold is creased using a 10 kilogram roller which is passed over the fold once along the fold line. The sheet is unfolded and any toner that has flaked off the crease is brushed away with a cotton swab. The crease is examined with a 100× microscope with a measuring grid in the eye piece, and measurement of the gap widths perpendicular to the crease of the five largest gaps is made. Measurement of the imaged area along the crease should not show discontinuities that exceed 0.75 mm in total.

Matrix Physical and Electrical Properties

In order for the inventive products to serve as multipurpose imageable sheets, it is essential that the matrix have the following specific physical and electrical properties.

Hardness

The matrix layer shall be hard enough to both resist scoring by pencils normally used and to facilitate erasure of pencil and ink lines. This quality is measured with a Gardner Hardness Tester using the ASTM Test method D3363. The hardness shall be preferably between 2B and 7H and shall be at least 4B to 9H.

Ink Qualities

The surface of the matrix shall accept aqueous-solvent type inks to provide uniformly dense, sharp, continuous lines when applied either manually or by pen plotter. This ink acceptance quality is quantified by measuring the contact angle using an aqueous based ink such as Higgins Black Magic Ink, or its equivalent, and a Tantec contact measuring device. The contact angle shall be preferably between 40° and 80° and at least between 20° and 120°.

Surface Resistivity

The matrix surface shall have a resistivity range of preferably from $1\times10^9$ to $1\times10^{12}$ ohms per square but at least between $1\times10^8$ and $1\times10^{15}$ ohms per square as measured by a Keithly 602 electrometer.

Abrasivity to Pencil

Surface abrasivity shall be preferably between 0.0015 and 0.008 gram, but at least between 0.001 to 0.100 gram to provide the pencil tooth necessary to obtain suitable pencil take, erasability and redraw properties. Pencil abrasivity measurements are made utilizing a Hewlett Packard 7580A plotter equipped with a pencil lead marking device. A Pentel HIPOWER SUPER 0.5 mm HB lead is inserted into the holder, and the lead and holder are weighed. A 24×36 inch sheet of sample media is loaded into the plotter, and the marking device is loaded into the plotter. A line plot is generated to provide eighty four 18 inch lines, drawn at a marking speed of 20 cm/sec with a force of 42 grams. After completion of the plot the marking device is re-weighed to determine the amount of pencil wear, expressed in grams.

The following examples are provided as an aid to those desiring to practice the present invention, but is not limited thereto. For example, while ingredients such as Chempol 20-4301 (an acrylic emulsion), Chempol 20-1642 (an epoxy emulsion), RP-4 (an acrylic emulsion), R972 (a urethane dispersion), CX-100 (an aziridine crosslinker), and others are used in certain of the aqueous-based coating formulations in the following Examples, other suitable ingredients in suitable amounts, such as described herein, could be used in such examples without departing from the spirit or scope of the present inventive discovery.

EXAMPLE 1

To a sheet of a 100% rag vellum, there is applied with a Meyer rod about 3.5 grams per square meter of a colorless mineral oil (Arco Corporation) having a refractive index within 0.06 refractive index units of the rag paper. The rag paper sheet is rolled onto a core and the mineral oil is allowed to distribute evenly throughout the paper for about 16 hours, to give a transparentized paper sheet.

The following surface coating mixture is prepared using a high speed stirrer:

| Ingredients | Supplier | Amount |
|---|---|---|
| Deionized Water | | 150 ml |
| EPI REZ 5520-W-60 (60%) | Shell Chemical Co. | 400 g |
| EPI CURE 3295 | Shell Chemical Co. | 11 g |
| Amorphous Silica TS-100 | Degussa AG | 5 g |
| Amorphous Silica WP-2 | Crossfield | 1 g |

The prepared coating mixture is applied to the transparentized paper sheet using a Meyer rod to produce a surface coating having a dry weight of about 13–14 g/m$^2$. The surface coating layer is dried and cured (i.e., crosslinked) by heating the coated sheet to at least 100° C. for 4 minutes.

EXAMPLE 2

The base support selected for transparentization is a 25% rag vellum and is transparentized according to the procedure described in Example 1. Additionally, the following coating mixture is prepared using a high speed stirrer and applied to the surface of the transparentized substrate as described in Example 1.

| Ingredients | Supplier | Amount |
|---|---|---|
| Deionized Water | | 150 ml |
| EPI REZ W 35201 | Shell Chemical Co. | 400 g |
| EPI CURE 3295 | Shell Chemical Co. | 11 g |
| Amorphous Silica TS-100 | Degussa AG | 5 g |
| Amorphous Silica WP-2 | Crossfield | 1 g |

EXAMPLE 3A

The following coating mixture is prepared using a high speed stirrer and applied to the surface of the transparentized substrate as described in Example 1.

| Ingredients | Supplier | Amount |
|---|---|---|
| Deionized Water | | 150 ml |
| EPI REZ 5520-W-60 | Shell Chemical Co. | 400 g |
| EPI CURE 3295 | Shell Chemical Co. | 11 g |
| Amorphous Silica, ZEOTHIX 265 | Huber | 5 g |
| Crystalline Silica, MINUSIL-5-$\mu$ | US Silica | 15 g |

EXAMPLE 3B

The following coating mixture is prepared using a high speed stirrer and applied to the surface of the transparentized substrate (100% rag vellum) as described in Example 1.

| Ingredients | Supplier | Amount |
|---|---|---|
| Deionized Water | | 150 ml |
| Chempol 20-4301 | CCP Polymers | 150 g |
| Chempol 20-1642 | CCP Polymers | 7.5 g |
| EPI CURE 3295 | Shell Chemical Co. | 1.25 g |
| Amorphous Silica TS-100 | Degussa AG | 10 g |
| Amorphous Silica WP-2 | Crossfield | 1 g |

EXAMPLE 3C

The following coating mixture is prepared using a high speed stirrer and is then applied to the surface of non-rag non-transparentized vellum type paper, as described in Example 1.

| Ingredients | Supplier | Amount |
|---|---|---|
| Deionized Water | | 29 ml |
| NeoRez R-972 | Zeneca | 107 g |
| Amorphous Silica TS-100 | Degussa AG | 1.9 g |
| Amorphous Silica 200DF | Crossfield | 3.8 g |
| CX-100 (50% Soln.) | Zeneca | 1.0 g |

EXAMPLE 4

The following pigment dispersion and the lacquer formulations are each made separately. The pigment dispersion is first ball milled for one hour and then a specified amount of said pigment dispersion is added slowly to the lacquer with good stirring. Then, 8.0 grams dry weight per meter of this well-dispersed mixture is applied to a sheet of ICI pretreated type 505 3 mil polyester film using a Meyer rod and the sheet is placed in an oven and dried and cured at 100° C. for 4 minutes.

Pigment Dispersion:

| Ingredients | Supplier | Amount |
|---|---|---|
| Water, deionized | | 233 ml |
| Glascol RP-4 | Allied Colloids | 10 g |
| Titanium Dioxide CR-800 | Kerr McGee | 15 g |
| MINUSIL 5-μ | US Silica | 262 grams |

Lacquer:

| Ingredients | Supplier | Amount |
|---|---|---|
| Deionized water | | 29 ml |
| Glascol RP4 | Allied Colloids | 44 g |
| Pigment Dispersion | (see above) | 40 g |
| CX-100 (50% soln.) | Zeneca | 1.6 g |

EXAMPLE 5

The pigment dispersion and the lacquer shown below are each made separately. The pigment dispersion is first ball milled for one hour and then a specified amount is added slowly to the Lacquer with good stirring. Then, 8.0 grams dry weight per meter of this well-dispersed mixture is applied to a sheet of ICI pretreated type 505 3 mil polyester film using a Meyer rod and the sheet is placed in an oven and dried and cured at 100° C. for 4 minutes.

Pigment Dispersion:

| Ingredients | Supplier | Amount |
|---|---|---|
| Water, deionized | | 233 ml |
| NeoRez R-972 | Zeneca | 10 g |
| Titanium Dioxide CR-800 | Kerr McGee | 15 g |
| MINUSIL 5-μ | US Silica | 262 g |

Lacquer:

| Ingredients | Supplier | Amount |
|---|---|---|
| Deionized water | | 29 ml |
| R-972 | Zeneca | 112 g |
| Pigment Dispersion | (see above) | 100 g |
| CX-100 (50% soln.) | Zeneca | 4.0 g |

EXAMPLE 6

The pigment dispersion and the lacquer shown below are each made separately. The pigment dispersion is first ball milled for one hour and then a specified amount is added slowly to the lacquer with good stirring. Then, 8.0 grams dry weight per meter of this well-dispersed mixture is applied to a sheet of ICI pretreated type 505 3 mil polyester film using a Meyer rod and the sheet is placed in an oven and dried and cured at 100° C. for 4 minutes.

Pigment Dispersion:

| Ingredients | Supplier | Amount |
|---|---|---|
| Water, deionized | | 233 ml |
| Chempol 20-4301 | CCP polymers | 10 g |
| Titanium Dioxide CR-800 | Kerr McGee | 15 g |
| MINUSIL 5-μ | US Silica | 262 g |

Lacquer:

| Ingredients | Supplier | Amount |
|---|---|---|
| Deionized water | | 29 ml |
| Chempol 20-4301 | CCP Polymers | 90 g |
| Chempol 20-1642 | CCP Polymers | 10.6 g |
| Epicure 3295 | Shell Chemical | 0.76 g |
| Pigment Dispersion | (see above) | 89 g |

The prepared image receptive sheets of the aforementioned Examples provided acceptable results when tested by manual drafting, pen plotter, and electrophotographic printing and copying applications.

The description provided in this specification, including the above examples, is not to be construed as being unduly limiting to the present inventive discovery. This is because those of ordinary skill in the relevant art recognize that certain variations and changes may be made in the procedures and materials set forth in this specification, without departing from the spirit or scope of the present invention. For this reason, the inventive discovery is only to be limited by the scope of the claims appended hereto, and to equivalent embodiments thereof.

We claim:

1. An imageable sheet, comprising:

a base support having an image-receptive surface coating layer on at least one side thereof, wherein said surface coating layer possesses a hardness of at least 4B to 9H, a pencil abrasivity of from 0.001 to 0.010 gram, a surface resistivity of from $1\times10^8$ to $1\times10^{15}$ ohms per square, and an ink contact angle of from 27° to 120°, wherein said surface coating layer is prepared from an aqueous-based coating formulation that comprises (i) an aqueous dispersion of a crosslinking polymer or copolymer and a crosslinking agent therefor, and (ii) a pigment, and wherein said surface coating layer is formed by applying said aqueous-based coating formulation to at least one side of the base support and drying the same.

2. The imageable sheet of claim 1, wherein the base support is a vellum.

3. The imageable sheet of claim 1, wherein the base support is an opaque paper.

4. The imageable sheet of claim 1, wherein the base support is a film.

5. An imageable sheet, comprising:

a vellum base support that has been transparentized by impregnating a vellum sheet with a transparentizing agent having a refractive index within 0.06 refractive index units of said vellum sheet, and a surface coating layer on at least one surface of the vellum base support;

wherein the surface coating on the surface of the transparentized paper possesses a hardness of at least 4B to 9H, a pencil abrasivity of from 0.001 to 0.010 gram, a surface resistivity of from $1\times10^8$ to $1\times10^{15}$ ohms per square, and an ink contact angle of from 27° C. to 120° C., wherein said surface coating layer is prepared from an aqueous-based coating formulation that comprises (i) an aqueous dispersion of a crosslinking polymer or copolymer and a crosslinking agent therefor, and (ii) a pigment, and wherein said surface coating layer is formed by applying said aqueous-based coating formulation to at least one side of said vellum base support and drying the same.

6. The imageable sheet according to claim 5, wherein said transparentizing agent is an organic solvent-free transparentizing liquid having a refractive index of from 1.460 to 1.488 at 25° C.

7. The imageable sheet of claim 6, wherein said transparentizing liquid is selected from the group consisting of mineral oil, polybutene and glycol esters of hydrogenated resins.

8. The imageable sheet of claim 6, wherein said transparentizing liquid is mineral oil.

9. The imageable sheet of claim 1 or 5, wherein the crosslinking polymer or copolymer is selected from the group consisting of:

a crosslinking copolymer of diglycidyl ethers of bisphenol, a crosslinking urethane modified bisphenol epoxy resin, and a crosslinking modified acrylic resin.

10. The imageable sheet of claim 1 or 5, wherein the ratio of crosslinking polymer or copolymer to pigment present in the coating layer is within the range of from about 100:2 to about 100:12, on a weight/weight basis.

* * * * *